US011258636B2

(12) United States Patent
Zhao

(10) Patent No.: US 11,258,636 B2
(45) Date of Patent: Feb. 22, 2022

(54) METHOD AND APPARATUS FOR CONTROLLING A STATE OF A CONTROLLABLE DEVICE

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/479,233

(22) PCT Filed: Sep. 26, 2017

(86) PCT No.: PCT/CN2017/103414
§ 371 (c)(1),
(2) Date: Jul. 19, 2019

(87) PCT Pub. No.: WO2018/137353
PCT Pub. Date: Aug. 2, 2018

(65) Prior Publication Data
US 2019/0386852 A1 Dec. 19, 2019

(30) Foreign Application Priority Data
Jan. 25, 2017 (CN) .......................... 201710056316.6

(51) Int. Cl.
H04L 12/66 (2006.01)
H04L 12/28 (2006.01)
H04L 29/06 (2006.01)

(52) U.S. Cl.
CPC ............ *H04L 12/66* (2013.01); *H04L 12/282* (2013.01); *H04L 63/101* (2013.01)

(58) Field of Classification Search
CPC ..... H04L 12/66; H04L 12/282; H04L 63/101; H04L 12/2809; H04L 63/107;
(Continued)

(56) References Cited

U.S. PATENT DOCUMENTS

2001/0034656 A1 10/2001 Lucas et al.
2002/0072356 A1 6/2002 Yamashita et al.
(Continued)

FOREIGN PATENT DOCUMENTS

CN 1364043 A 8/2002
CN 102710625 A 10/2012
(Continued)

OTHER PUBLICATIONS

First Office Action for Chinese Patent Application No. 201710056316.6 dated Apr. 24, 2020.

*Primary Examiner* — Dady Chery
(74) *Attorney, Agent, or Firm* — Calfee, Halter & Griswold LLP

(57) ABSTRACT

A method and an apparatus for controlling a state of a controllable device. The method for controlling the state of the controllable device comprises: obtaining a first client list of at least one associated client of the controllable device and a second client list of clients currently connected with a reference device of the controllable device, comparing the first client list with the second client list so as to determine whether any of the at least one associated client is connected with the reference device, and controlling a state of the controllable device based on a result of the comparing.

20 Claims, 8 Drawing Sheets

(58) Field of Classification Search
CPC ...... H04L 67/025; H04L 67/24; H04W 84/12; H04W 4/80; H04W 12/10
See application file for complete search history.

(56) References Cited

U.S. PATENT DOCUMENTS

2008/0271123 A1* 10/2008 Ollis .................. H04L 12/2818
726/4
2012/0303137 A1* 11/2012 Schoeller ............. H04L 12/282
700/1
2016/0315784 A1* 10/2016 Wu .................... H04L 12/2816

FOREIGN PATENT DOCUMENTS

| CN | 104062921 A | 9/2014 |
| CN | 104125125 A | 10/2014 |
| CN | 104898613 A | 9/2015 |
| CN | 105007207 A | 10/2015 |
| CN | 204926478 U | 12/2015 |

\* cited by examiner

METHOD AND APPARATUS FOR CONTROLLING A STATE OF A CONTROLLABLE DEVICE

RELATED REFERENCE

This application is the U.S. national phase entry of PCT Application No. PCT/CN2017/103414, filed Sep. 26, 2017, which is based upon and claims priority to the Chinese patent application No. 201710056316.6 filed on Jan. 25, 2017, the entire contents of which are incorporated herein by reference.

FIELD

This disclosure relates to the field of communication technology, particularly to a method and an apparatus for controlling a state of a controllable device.

BACKGROUND

With the development of internet of things and mobile internet technologies, there have been more and more varieties of terminal devices, the functions thereof have also been improved greatly. Generally, the terminal devices can be connected to a network in a wired or wireless manner, and can be remotely controlled and managed by other devices by means of a network server.

At present, a terminal device can support various modes. From the perspective of energy saving, the terminal device can support a normal operating mode and a power saving mode. From the perspective of privacy protection, the terminal device can support privacy a protection mode, a non-privacy protection mode, etc. However, when the terminal device is adjusted to different modes or states, in most cases, control over the terminal device, whether it is direct control or remote control through the network server, has to be performed manually. This results in a low degree of automation of control over the terminal device, which influences the user experience.

Therefore, solutions for mitigating or releasing the problems are required.

SUMMARY

In a first aspect, an exemplary embodiment provides a method for controlling a state of a controllable device. The controllable device associates with at least one associated client and a reference device. The method comprises the steps of: obtaining a first client list of the at least one associated client and a second client list of clients currently connected to with the reference device; comparing the first client list with the second client list so as to determine whether any of the at least one associated client is connected with the reference device; and controlling a state of the controllable device based on a result of the comparing.

In an exemplary embodiment, the controllable device accesses the server through a network access device, and the network access device is the reference device. Optionally, the network access device is a local area network (LAN) gateway.

In an exemplary embodiment, the first client list is maintained by the server and the second client list is maintained by the reference device. The obtaining step comprises transmitting by the controllable device a first request message to the server to request the server to provide the first client list; receiving a first response message carrying the first client list and returned by the server; transmitting a second request message to the reference device to request the reference device to provide the second client list; and receiving a second response message returned by the reference device, which second response message carries the second client list.

In an exemplary embodiment, the first client list is maintained by the server. The obtaining step comprises the following steps performed by the reference device: generating the second client list based on a client(s) currently connected to the reference device; transmitting a third request message to the controllable device to request the controllable device to provide the second client list; and receiving a third response message returned by the controllable device and carrying the second client list obtained by the controllable device from the server. Optionally, the controlling step comprises determining by the reference device a control instruction based on the result of the comparing; and transmitting a control request message carrying the control instruction to the controllable device to instruct the controllable device to execute the control instruction.

In an exemplary embodiment, the controllable device is equipped with a short distance peer-to-peer connection functionality and is the reference device. The obtaining step further comprises: generating the second client list based on a client(s) that currently establishes a short distance peer-to-peer connection with the controllable device.

In an exemplary embodiment, the first client list is created based on a client(s) that is registered with the server as being associated with the controllable device, and/or the first client list is created based on a user input and the associated client of the controllable device is included therein.

In a second aspect, an exemplary embodiment further provides an apparatus for controlling a state of a controllable device. The controllable device associates with at least one associated client and a reference device. The apparatus comprises: an obtainer, a comparator and a controller. The obtainer is used for obtaining a first client list of the at least one associated client and a second client list of clients currently connected with the reference device. The comparator is used for comparing the first client list with the second client list so as to determine whether any of the at least one associated client is connected with the reference device. The controller is used for controlling a state of the controllable device based on a result of the comparing.

In an exemplary embodiment, the first client list is maintained by the server and the second client list is maintained by the reference device. The apparatus comprises: a transmitter and a receiver. The obtainer is configured to instruct the transmitter to transmit a first request message to the server to request the server to provide the first client list, and transmit a second request message to the reference device to request the reference device to provide the second client list. The obtainer is configured to obtain the first client list from a first response message received by the receiver and returned by the server and the second client list from a second response message received by the receiver and returned by the reference device.

In an exemplary embodiment, the controllable device is equipped with a short distance peer-to-peer connection functionality and is the reference device. The obtainer comprises: a list generator being configured to generate the second client list based on a client(s) that currently establishes a short distance peer-to-peer connection with the controllable device.

In an exemplary embodiment, the obtainer comprises: a list generator for generating the second client list based on a client(s) currently connected to the reference device. The apparatus further comprises: a transmitter and a receiver. The obtainer is configured to instruct the transmitter to transmit a third request message to the controllable device to request the controllable device to provide the first client list; and obtain the first client list from a third response message received by the receiver.

In an exemplary embodiment, the controller comprises a selector being configured to select a control instruction based on the result of the comparing. The controller is configured to instruct the transmitter to transmit a control request message carrying the control instruction to the controllable device to instruct the controllable device to execute the control instruction.

In an exemplary embodiment, the apparatus further comprises: a list creator. The list creator is used for creating the first client list based on a client(s) registered with the server as being associated with the controllable device and/or creating the first client list based on a user input and including the associated client of the controllable device therein.

In a third aspect, an exemplary embodiment further provides a controllable device comprising the apparatus for controlling a state of the controllable device as stated above. The controllable device comprises a controllable component. The controller is configured to control state of the controllable component based on the result of the comparing.

In a fourth aspect, an exemplary embodiment further provides a network access device comprising the apparatus for controlling a state of the controllable device as stated above. The network access device comprises a network communication unit. The obtainer is configured to obtain the first client list via the network communication unit. The controller is configured to transmit a control request message to the controllable device via the network communication unit.

In a fifth aspect, an exemplary embodiment further provides a computer readable storage medium on which a computer instruction is stored, wherein the instruction, when executed by a processor, performs the steps of the method stated above.

In a sixth aspect, an exemplary embodiment further provides a computing device for controlling a state of the controllable device, comprising a memory, a processor and a computer program stored on the memory and run on the processor, wherein the processor, when executing the program, implements the steps of the method stated above.

BRIEF DESCRIPTION OF THE DRAWINGS

The following explanations and drawings expound some illustrative aspects and implementations of exemplary embodiments. These only indicate that several of the various manners in one or more aspects can be used. When considered in conjunction with the drawings, other aspects, advantages and novel features of this disclosure will become obvious in the following detailed description.

DETAILED DESCRIPTIONS

In the following description, for explanation rather than limitation, some particular details such as architecture, interface and technology of the disclosed exemplary embodiments are stated, so as to understand this disclosure clearly and thoroughly. However, the skilled person in the art should understand easily that this disclosure can be implemented in other embodiments that do not conform exactly to the details set forth herein, without departing significantly from the spirit and scope of this disclosure. Further, in this context, and for the purpose of brevity and clarity, detailed descriptions of well-known apparatus, circuits and methodology have been omitted so as to avoid unnecessary detail and possible confusion.

Figure 1:
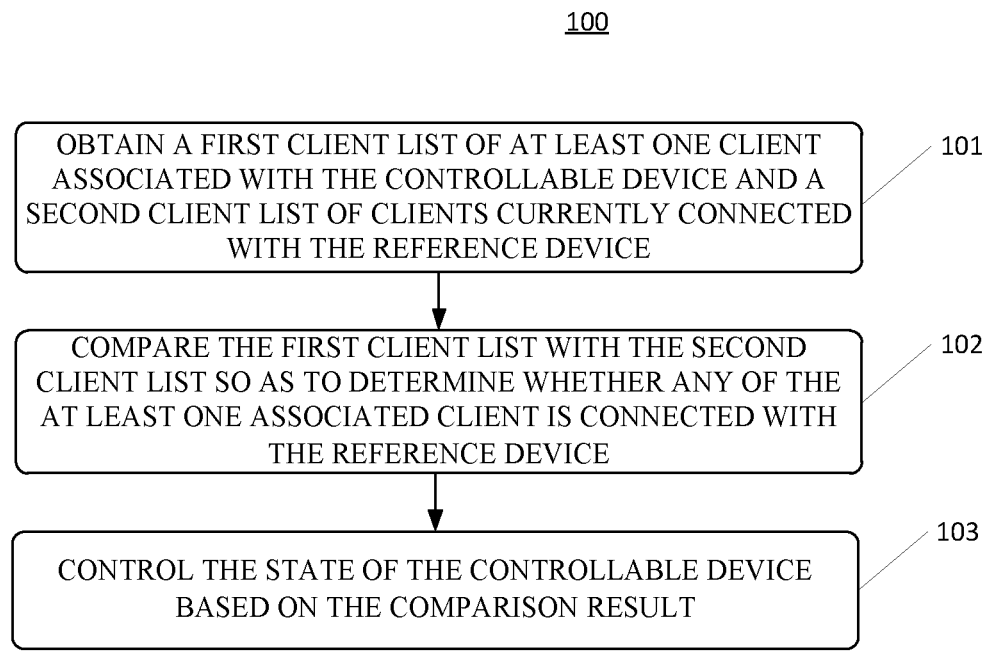
FIG. 1 shows a flow chart of a method for controlling a state of a controllable device according to an exemplary embodiment.

FIG. 1 shows a method 100 for controlling a state of a controllable device according to an exemplary embodiment.

In some exemplary embodiments, the controllable device is a device that can be controlled to change its state. For example, the controllable device can include a camera, a fingerprint lock or an intelligent electrical appliance involved in smart home, such as intelligent air conditioning, intelligent refrigerator. The controllable device can be controlled locally or controlled remotely via a network. According to an exemplary embodiment, the controllable device is configured to associate with at least one associated client and a reference device.

At step 101, a first client list of at least one client associated with the controllable device and a second client list of client(s) currently connected with the reference device are obtained.

In an exemplary embodiment, a client may be in a form of software, such as a software component, a program, an application, a computer program, an application program, a system program, a machine program and so on. The client may also be in a form of hardware. For example, the client may be a portable mobile device, such as a mobile phone, a personal digital assistant, a portable game machine, a wearable device. Corresponding to clients in different forms, the manners of recording or identifying the clients may also be different. The client in the form of software can for example be recorded through the user name of the user of the client. The client in the form of hardware can be recorded through the device identification related to the hardware of the client, such as medium access control (MAC) address of a network device or the international mobile equipment identifier (IMEI) of a mobile device, or can also be recorded through the user identification allocated to the client, such as the international mobile subscriber identification (IMSI) of the mobile device or the number of a mobile phone.

In some exemplary embodiments, the client can be a client registered with the server as being associated with the controllable device. The server generates a first client list based on registered clients, so as to indicate the associated clients of the controllable device. Additionally or alternatively, the first client list can also be created by a user and clients associated with the controllable device are manually included therein.

For example, the controllable device may be a camera which comprises a plurality of associated clients, such as mobile phones S1, S2, S3. According to an exemplary embodiment of this disclosure, on the one hand, the mobile phones S1, S2 may be registered with the server so as to become associated clients of the camera. On the other hand, the mobile phone S3 can become an associated client of the camera through setting of a user (i.e., operator) of the camera without being registered with the server.

In some exemplary embodiments, the first client list may be maintained by the server. In these exemplary embodiments, the controllable device can access the server, so as to obtain from the server the first client list that records the associated clients thereof. The server may be a local server in the same home local area network as the controllable device, and may also be a remote server in a wide area network, such as the internet. The controllable device may be connected to the server through a network access device. The network access device for example is a wireless access point, a router, a hub, a gateway, a bridge or a combination thereof. The network access device is optionally a gateway of a local area network.

In an exemplary embodiment, the reference device may be a device physically or logically associated with the controllable device. In some exemplary embodiments, the reference device may be a device physically close to the controllable device. For example, when the controllable device is in a certain local area network, the reference device may be set as a gateway through which the controllable device accesses the local area network. In some other exemplary embodiments, the reference device may be a device logically, such as in network topology, close to the controllable device. For example, when the controllable device is connected to a server through a network (adjacent to the server in the network topology) and for example can accept control via the server, the reference device may be set as the server. In some further exemplary embodiments, the reference device can also be set as the controllable device per se.

A client in a client list may be identified through the identification information of the client, as long as the identification information can identify the client uniquely. In an exemplary embodiment, the identification information of the client includes but not limited to a user name of the client, a device name, a MAC address etc.

Optionally, an associated client of a controllable device can control the controllable device. In one implementation, the associated client can control the controllable device remotely by means of a network server. It can be understood that there may also be no control relationship between the associated client and the controllable device.

At step 102, the obtained first client list and second client list are compared so as to determine whether any of the at least one associated client is connected with the reference device. The first and second client lists can include one or more clients. Or, in the event that no client is currently connected with the reference device, the second client list may also be empty.

In an exemplary embodiment of this disclosure, because the first client list corresponds to associated client(s) of the controllable device, and the second client list corresponds to clients connected to the reference device, the information on connection between each of the associated client(s) and the reference device may be obtained by comparing the first client list with the second client list. For example, if the result of the comparing indicates that one or more clients in the first client list match with the clients in the second client list, it represents that the one or more associated clients are being connected with the reference device currently. If all of the client(s) in the first client list match with the clients in the second client list, it represents that all of the associated client(s) are being connected with the reference device currently. If no client in the first client list matches with the clients in the second client list, it represents that no associated client is connected with the reference device currently. The result of the comparing can further indicate that there are also other clients than the associated clients connected with the reference device. It can be understood that in some scenes, there may be associated or unassociated clients of one or more controllable devices connected with the reference device simultaneously.

At step 103, state of the controllable device is controlled based on the result of the comparing.

According to an exemplary embodiment, various modes may be used to control the state of the controllable device based on, for example, the comparison result indicating the information on the connection between each of the associated client(s) of the controllable device and the reference device. The control mode depends on the user's requirement. The user can design corresponding control strategies based on his/her own requirement, just as detailed in the following.

In an example scene, the controllable device may be a camera, the associated client thereof is a mobile phone, and the reference device is a gateway of the local area network where the camera locates.

When the camera for example is used by user A whose profession is a network anchor, user A may hope that the camera starts live broadcast through the network only when he/she is in the vicinity of the camera. Correspondingly, the control strategy may be designed as: when the mobile phone of user A is connected to the same local area network as the camera, i.e., the mobile phone of the anchor is connected with the gateway of the local area network, controlling the state of the camera to enable the camera to enter a video mode so as to perform webcast. Additionally, or alternatively, the control strategy can also be designed as: when the mobile phone of user A is connected to the same local area network as the camera, controlling the state of a network connection component of the camera, to enable the camera to be connected to the internet via the network connection component, so as to transmit the captured video to the network for online live show. However, when the mobile phone of user A is not connected to the local area network, the network connection component disconnects the connection with the internet, to enable the camera to be in an off-line state so as to stop the webcast.

When the camera for example is used by an ordinary user B, user B may hope that the camera stops video-capturing as long as he/she is in the vicinity of the camera, so as to avoid his/her private life being recorded. Correspondingly, the control strategy therefor may be designed in a completely opposite way as: when the mobile phone of the ordinary user B is connected to the same local area network as the camera, i.e., the mobile phone of the ordinary user B is connected with the gateway (reference device) of the local area network, controlling the state of the camera, to enable to the camera to quit from the previous video mode so as to switch to the sleep mode.

In some exemplary embodiments, the controllable device comprises a controllable component, and controlling the state of the controllable device includes controlling the state of the controllable component. The controllable component of the controllable device can include a mechanical structure and an electronic component and the like. The state of the controllable component of the controllable device can include at least one of the following: the state of the mechanical structure and the working mode of the electronic component etc. For example, the mechanical structure may include a rotation mechanism, and the state of the mechanical structure includes a rotatable state and a non-rotatable state or a state of rotating to a certain angle etc. The electronic component may include a mode switch, and the working mode of the electronic component may include an active mode (i.e., normal working mode) and a sleep mode etc.

In some exemplary embodiments, the mechanical structure state of the controllable device for example is the normal working state of an actuator or the abnormal working state of the actuator. Take the camera as an example, controlling the state of the mechanical structure (e.g., a rotatable mechanism) of the camera may be e.g., enabling the camera to be in the normal working state in which it faces towards a preset monitoring area, or enabling the camera to be in an abnormal working state in which it deviates from the preset monitoring area (by adjusting the rotatable mechanism). Additionally, or alternatively, the mechanical structure can also be a protection mechanism in front of the lens of the camera. Correspondingly, controlling the state of the mechanical structure of the camera may e.g., enable the protection mechanism of the camera to be in a normal working state of not blocking the lens or in an abnormal working state of blocking the lens (by changing the position of the protection mechanism).

In some exemplary embodiments, working mode of the circuitry in the controllable device can also be a normal working mode or an abnormal working mode. Take the camera as an example, controlling the working mode of the electronic component (e.g., the mode switch) of the camera for example may enable the camera to be in an active mode or a sleep mode.

As pointed out above, when the state of the controllable device is controlled based on the result of the comparing, depending on different scenes, different control strategies may be employed to control the state of the controllable device even if the comparison result is the same. Next, it will be further explained how to control the state of the controllable device in conjunction with several different example scenes.

In a first example scene, the controllable device is a home camera. The associated client of the controllable device may be a mobile phone that is often carried by a user of the camera. The camera and the mobile phone may be both connected to the same local area network through a gateway. The gateway is the reference device of the controllable device.

Initially, the camera may be in a normal working state, e.g., a video-capturing state. When it is detected that a mobile phone is connected to the gateway, the identification information of the mobile phone is obtained and is compared with the identification information of an associated client(s) of the camera. When the comparison result indicates that the identification information of the mobile phone matches with the identification information of a respective associated client of the camera, it can be learnt that an associated client is connected with the reference device, i.e., it indicates that the user has been at home. At this point, if the preset control strategy is a privacy protection strategy, the working mode of the electronic component of the camera may be adjusted correspondingly, for example, converting the normal working mode of the camera to the abnormal working mode (such as sleep mode or standby mode) so as to stop video-capturing. Alternatively, the mechanical structure state of the camera may be adjusted correspondingly, for example, making the lens be rotated from pointing to the effective monitoring area to pointing to the ineffective area, or making the protection mechanism of the camera be changed from a position of not blocking the lens to a position of blocking the lens, so as to avoid monitoring of the user's privacy.

However, when the associated mobile phone disconnects from the gateway, it can be learnt by obtaining the identification information of mobile phone(s) currently connected with the gateway and comparing the obtained identification information with the identification information of the associated clients of the camera that no associated client is connected with the reference device, i.e., indicating that the user may possibly go out. At this point, the camera may be controlled to convert its working mode, for example, making it return to the normal working mode so as to start video-capturing. Alternatively, the camera may be controlled to convert the state of its mechanical structure, for example, making the lens point to the effective monitoring area, or making the protection structure of the camera return to the position of not blocking the lens so as to start monitoring.

It could be understood that the design of the control strategy depends on the user's requirement. For example, based on the user's requirement, the control strategy can be designed as: when it is detected that mobile phones connected to the gateway not only include the associated mobile phone of the camera but also includes other unassociated mobile phones connected as visitors, making the camera to keep the active mode, i.e., continuing video-capturing.

In a second example scene, the controllable device is a fingerprint lock in an entrance guard system. Similarly, the associated client of the controllable device may be a mobile phone that is often carried by a user of the entrance guard system. The fingerprint lock and the mobile phone may be both connected to the same local area network through a gateway. The gateway is the reference device of the controllable device.

Initially, the fingerprint lock may be in a disabled state, i.e., a state of disabling unlock. When it is detected that a mobile phone is connected to the gateway, the identification information of the mobile phone is obtained and is compared with the identification information of the associated clients of the fingerprint lock. When the comparison result indicates that the identification information of the mobile phone matches with the identification information of a respective associated client of the fingerprint lock, it can be learnt that an associated client is connected with the reference device, i.e., it indicates that the user has been at home. At this point, the working mode of an electronic component of the fingerprint lock may be controlled correspondingly, for example, making a fingerprint scanning component of the fingerprint lock to be converted from the disable mode to an enable mode so as to enable the fingerprint scanning function, thereby allowing the user to unlock with his fingerprint.

When the mobile phone disconnects from the gateway, it can be learnt by obtaining the identification information of the mobile phone currently connected with the gateway and comparing the obtained identification information with the identification information of the associated clients of the fingerprint lock that no associated client is connected with the reference device, i.e., it indicates that the user may possibly go out. At this point, the fingerprint lock may be controlled to convert its state, for example, making the fingerprint scanning component to return to the disable mode so as to disable the fingerprint scanning function. This can further improve the security of the fingerprint lock and further reduce the working time of the fingerprint lock so as to prolong the lifetime.

The above first example scene and second example scene show exemplary embodiments of applying the technology of this disclosure in the environment of home LAN. However, it could be understood that the technology of this disclosure can also be applicable for an environment of a wide area network, e.g., the environment of Internet.

In a third example scene, the controllable device is an intelligent device in a smart home system that can accept remote control via a network, such as an intelligent refrigerator, an intelligent washing machine, an intelligent switch etc. An associated client of the controllable device may be a personal computing device of a user of the smart home system, for example a desktop computer, a tablet computer, a mobile phone, a personal digital assistant etc. The intelligent device and the personal computing device may be both connected to a server provided by a service provider via the network (e.g., internet), and the personal computing device can perform remote control over the intelligent device by means of the server. The server is the reference device of the controllable device.

Initially, the intelligent device may be in a non-network-controllable state. When it is detected that a personal computing device is connected to the server, the identification information of the personal computing device is obtained and is compared with the identification information of associated clients of the intelligent device. When the comparison result indicates that the identification information of the personal computing device matches with the identification information of a respective associated client of the intelligent device, it can be learnt that an associated client is connected with the reference device. At this point, the state of the intelligent device may be controlled correspondingly. For example, the controllable component (such as the parameter configuration component) of the intelligent device may be converted from the non-network-controllable mode to a network-controllable mode, so as to allow the user to perform remote control.

When the personal computing device disconnects from the server, it can be learnt by obtaining the identification information of the personal computing device currently connected with the server and comparing the obtained identification information with the identification information of associated clients of the intelligent device that no associated client is connected with the reference device. At this point, the user may have performed remote control over the intelligent device or the user does not require to remotely control the intelligent device. Thus, the state of the intelligent device may be controlled correspondingly. For example, its controllable component may be made to return to the non-network-controllable mode. This allows to better protect the intelligent device from malicious intrusion and improve security of the smart home system.

It should be understood that the above scenes are merely possible application for explaining the methods of embodiments of this disclosure. The exemplary embodiments of this disclosure are further applicable for other various scenes.

According to exemplary embodiments, the state of the controllable device is controlled based on the state of the connection between the associated client(s) of the controllable device and the reference device, which allows to realize automatic control over the controllable device, avoiding manual control and improving user experience.

In different implementations of exemplary embodiments, different devices may be used as the reference device of the controllable device. Moreover, the method according to exemplary embodiments may be executed by different executive subjects. For example, the reference device may be a network access device by means of which the controllable device accesses the communication network, such as a gateway in the same local area network with the controllable device, and may also be a server to which the controllable device is connected through a wide area network and by which the controllable device may be remotely controlled, or can even be the controllable device itself. In some implementations, the method according to embodiments of this disclosure may be executed by the controllable device and can also be executed by the reference device.

In FIG. 2, FIG. 3, FIG. 4 and FIG. 5, example implementations of methods according to exemplary embodiments are provided.

Figure 2:
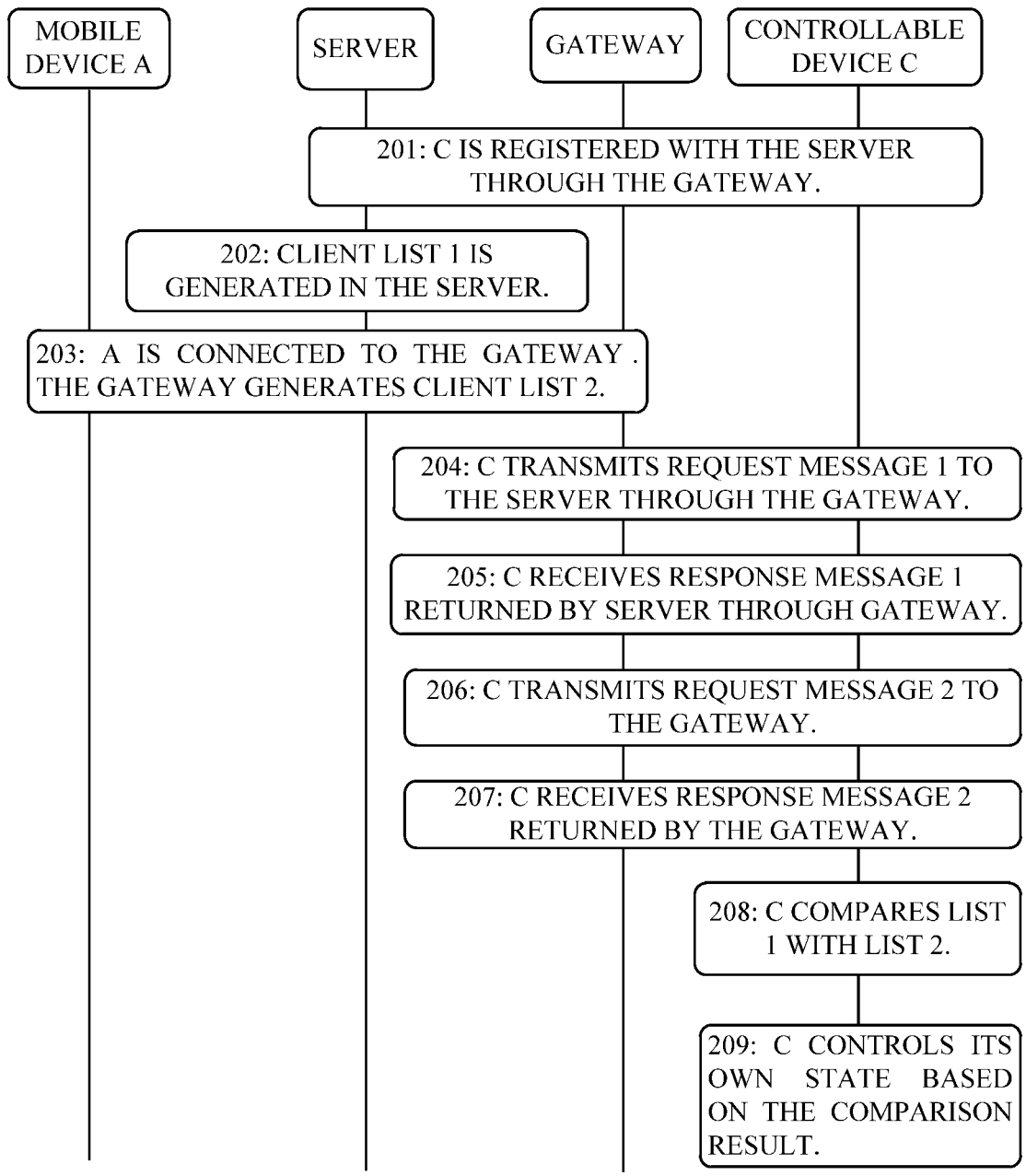
FIG. 2 shows an example implementation of a method according to an exemplary embodiment.

FIG. 2 shows an example implementation of a method according to an exemplary embodiment. In this implementation, it is assumed that controllable device C (such as a home camera) is connected to a server via a gateway, controllable device C has an associated client, i.e., mobile device A, and the gateway is the reference device. In this implementation, the method for controlling the state of the controllable device may be carried out by the controllable device C.

Referring to FIG. 2, the method 200 for controlling the state of the controllable device can comprise the following steps.

Step 201: Controllable device C is registered with the server through the gateway. The server can store identification information of controllable device C. The identification information of controllable device C can include the device name, the MAC address etc.

Step 202: Client list 1 of clients associated with controllable device C is generated in the server.

In one exemplary embodiment, mobile device A (such as a mobile phone) is registered with the server as an associated client of controllable device C. The server can store the identification information of mobile device A, and accordingly generate client list 1 containing the identification information of the associated client of controllable device C. Optionally, in the event that client list 1 already exists, the server can add the identification information of mobile device A into client list 1. The identification information of mobile device A can include the device name, the MAC address etc.

In another exemplary embodiment, client list 1 may be created by a user of controllable device C in the server. The user can set an associated client of the controllable device in client list 1, including adding or deleting an associated client of the controllable device.

FIG. 2 only shows one associated client of controllable device C, e.g., mobile device A. However, it could be understood that controllable device C may have a plurality of associated clients.

Step 203: When mobile device A reaches the local area network where controllable device C locates, mobile device A is connected to the gateway. The gateway stores the identification information of the client (including mobile device A) connected with it, and accordingly generates client list 2. At this point, client list 2 contains the identification information of mobile device A.

Step 204: Controllable device C transmits request message 1 to the server through the gateway to request the server to provide client list 1.

Step 205: Controllable device C receives response message 1 returned by the server through the gateway, which response message 1 may carry client list 1. Client list 1 may contain the identification information of the associated client (e.g., mobile device A) of controllable device C.

Step 206: Controllable device C transmits request message 2 to the gateway to request the gateway to provide client list 2.

Step 207: Controllable device C receives response message 2 returned by the gateway, which response message 2 may carry client list 2. Client list 2 may contain the identification information of the mobile device (e.g., mobile device A) connected with the gateway.

Step 208: Controllable device C compares client list 1 with client list 2 so as to determine whether any of associated client(s) is connected with the reference device. For example, controllable device C can match the identification information in client list 1 and client list 2.

Step 209: Controllable device C controls its own state, e.g., controlling the state of its controllable component, based on the comparison result. In one embodiment, controllable device C determines whether an associated client of controllable device C is connected with the gateway based on the comparison result. In the example as shown in FIG. 2, because mobile device A is the associated client of controllable device C, the determination result is "Yes". At this point, depending on the designed control strategy, controllable device C can thus be triggered to change its own state.

It could be understood that if, at step 203, it is another unregistered mobile device A' reaches the local area network where controllable device C locates, because mobile device A' is not an associated client of controllable device C, the determination result here is "No". Accordingly, controllable device C can keep the previous state.

In some exemplary embodiments, controllable device C can repeat the above steps 204 to 209 at certain time intervals. Optionally, controllable device C can also repeat the above steps 204 to 209 when it is learnt that clients connected with the gateway change. In some embodiments, the gateway can, when the client connected with it changes, inform controllable device C of the change. This allows the control over controllable device to respond to the change of its associated client more rapidly.

Figure 3:
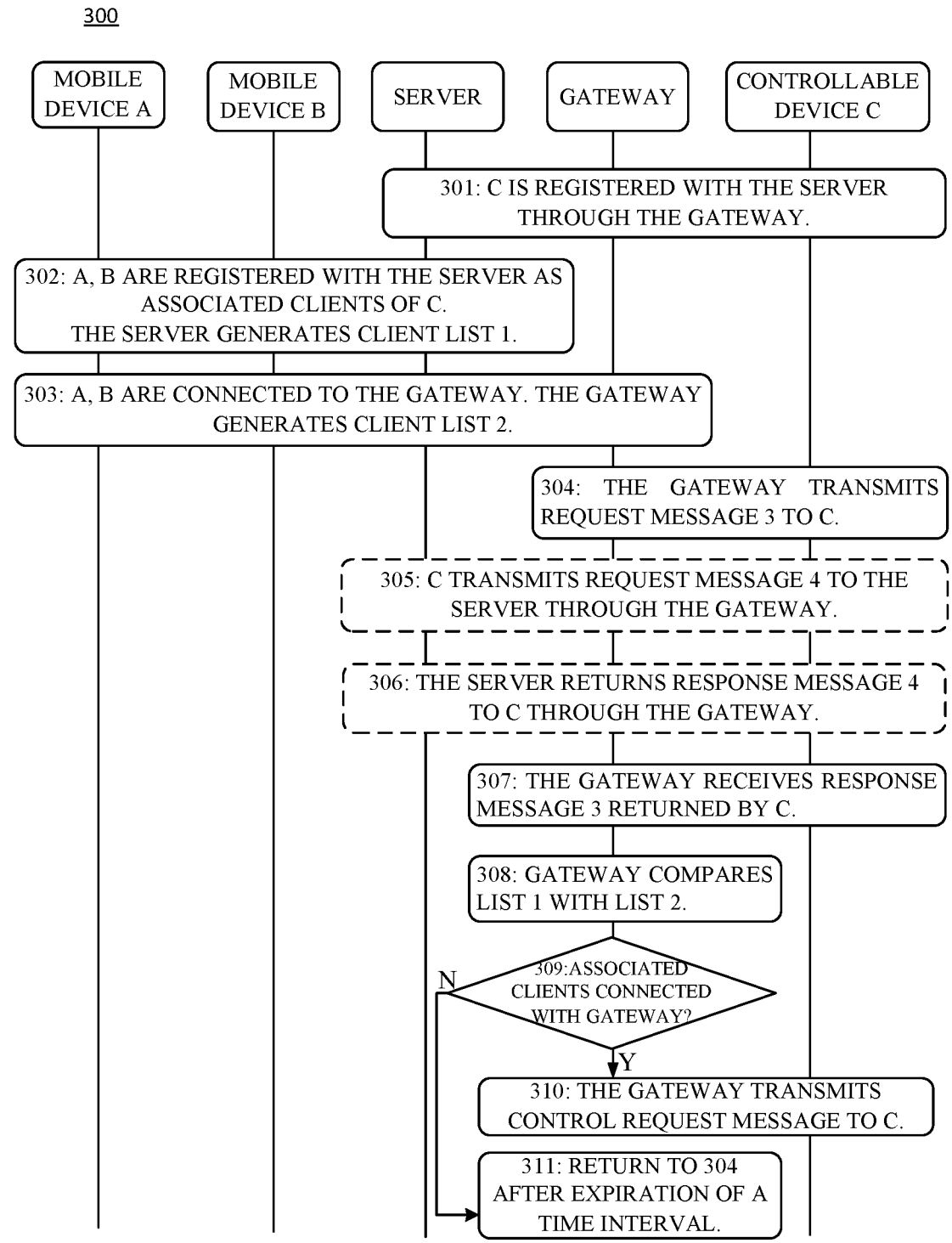
FIG. 3 shows another example implementation of a method according to an exemplary embodiment.

FIG. 3 shows another example implementation of a method according to an exemplary embodiment. In this implementation, similar to FIG. 2, it is assumed that controllable device C is connected to the server via a gateway, and the gateway is the reference device. Different from FIG. 2, FIG. 3 shows that controllable device C has two associated clients, i.e., mobile devices A and B, and the method for controlling the state of the controllable device is carried out by the reference device, e.g., the gateway. Referring to FIG. 3, the method 300 for controlling the state of controllable device can comprise the following steps.

Step 301: Controllable device C is connected with a gateway, and is registered with the server through the gateway. The server stores the identification information of controllable device C. The identification information of controllable device C can include the device name, the MAC address etc.

Step 302: Mobile devices A and B are connected with the server, and are registered with the server as the associated clients of controllable device C. The server stores the identification information of mobile devices A, B, and accordingly generates client list 1 containing the identification information of the associated clients of controllable device C. The identification information of mobile device A or B can include the device name, the MAC address etc. It could be understood that mobile devices A and B can perform the registration simultaneously or at different times.

Step 303: When mobile devices A, B reach the local area network where controllable device C locates, mobile devices A, B are connected to the gateway. The gateway stores the identification information of mobile devices A, B, and accordingly generates client list 2 containing the identification information of mobile devices A, B. It could be understood that mobile devices A and B may be connected with the gateway simultaneously or at different times.

Step 304: The gateway transmits request message 3 to controllable device C to request controllable device C to provide client list 1 of the associated clients of controllable device C.

Step 305: Because client list 1 of the associated clients of controllable device C is maintained by the server, controllable device C transmits request message 4 to the server through the gateway to request the server to provide client list 1.

Step 306: The server returns response message 4 to controllable device C through the gateway, which response message 4 may carry client list 1.

Step 307: The gateway receives response message 3 returned by controllable device C, which response message 3 may carry client list 1.

In some exemplary embodiments, controllable device C can generate and maintain client list 1 by itself, and it can return client list 1 to the gateway directly after receiving the request of the gateway. Thus, the steps 305 and 306 may be omitted.

Step 308: The gateway compares client list 1 with client list 2 so as to determine whether any of the associated client is connected with the reference device.

The gateway controls the state of the controllable component of controllable device C based on the comparison result. In one embodiment, at step 309, the gateway determines whether the associated clients of controllable device C are connected with it based on the comparison result. In this example, because the determination result is "Yes", at step 310, the gateway transmits a control request message to controllable device C to request controllable device C to control the state of its controllable component accordingly, for example, changing its own state, such as adjusting the state of its mechanical structure or the working mode of its electronic component.

In other cases, if other unregistered mobile devices A', B' reach the local area network where controllable device C locates at step 303, because neither of mobile devices A' and B' is associated client of controllable device C, the determination result at step 310 is "No", which indicates that no associated client is connected with the gateway. The gateway can transmit no control request message to controllable device C accordingly, and at step 311, return to step 304 after expiration of a certain time interval, so as to repeat this process. Optionally, the gateway can also repeat this process upon detection of change of the client connected with it.

Figure 4:
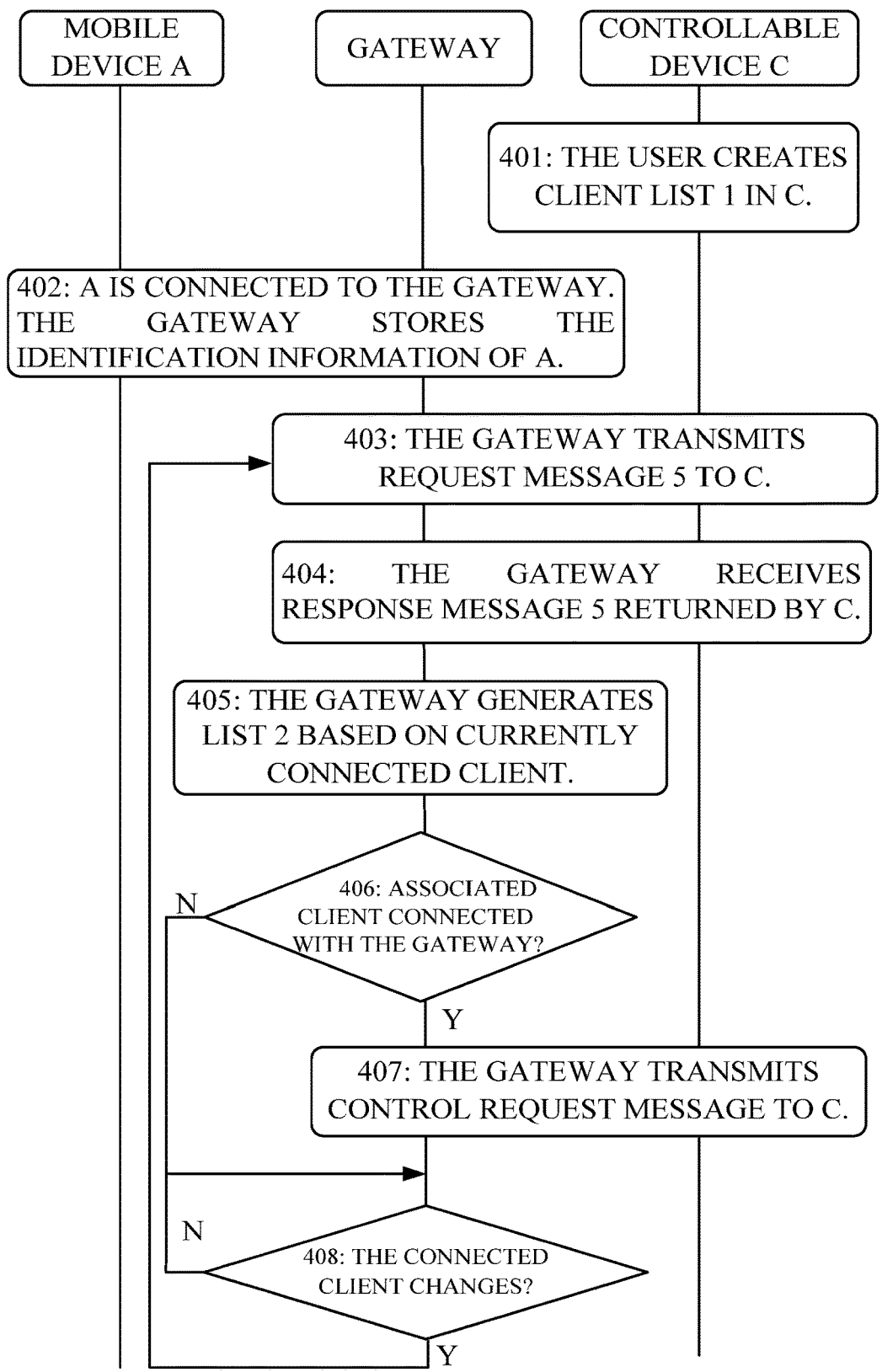
FIG. 4 shows a further example implementation of a method according to an exemplary embodiment.

FIG. 4 shows a further example implementation of a method according to an exemplary embodiment. In this implementation, similar to FIG. 3, it is assumed that controllable device C is connected to a local area network via a gateway. Controllable device C has an associated client, i.e., a mobile device A, and the gateway is the reference device.

In this implementation, the method for controlling the state of the controllable device is also carried out by the gateway. Different from FIG. 3, FIG. 4 shows that client list 1 of the clients associated with the controllable device is created manually by a user in the controllable device and is maintained by the controllable device itself. Although not shown, it could be understood that in the case of being maintained by the server, client list 1 can also be created manually by the user in the server.

Referring to FIG. 4, the method for controlling the state of controllable device can comprise the following steps.

Step 401: Controllable device C receives a user input for creating client list 1 of clients associated with controllable device C in controllable device C, and setting the associated clients of controllable device C in client list 1. For example, the user adds the identification information of mobile device A in client list 1 so as to set mobile device A as an associated client of controllable device C.

Step 402: When mobile device A reaches the local area network where controllable device C locates, mobile device A is connected to the gateway. The gateway stores the identification information of mobile device A.

Step 403: The gateway transmits request message 5 to controllable device C to request controllable device C to provide client list 1 of the associated client of controllable device C.

Step 404: The gateway receives response message 5 returned by controllable device C, response message 5 may carry client list 1. Client list 1 contains the identification information of mobile device A.

Step 405: The gateway generates client list 2 based on the currently connected clients thereof. Client list 2 contains the identification information of mobile device A.

Step 406: The gateway compares the list 1 with the list 2 so as to determine whether an associated client of controllable device C is connected with it. In this example, since the list 1 and the list 2 both contain the identification information of mobile device A, it may be determined that an associated client of controllable device C is currently connected with the gateway. Thus, at step 407, the gateway can transmit a control request message to controllable device C to request controllable device C to control the state of its controllable component accordingly.

In other cases, if it is another mobile device A' not set by the user reaches the local area network where controllable device C locates at step 402, because mobile device A' is not an associated client of controllable device C, the determination result here at step 406 will indicate that no associated client is connected with the gateway. The gateway can thereby transmit no control request message to controllable device C, and proceed to step 408.

It could be understood that, depending on the control strategy used, the gateway can also transmit no control request message when it is determined that an associated client of controllable device C is currently connected with the gateway, and transmit a control request message when it is determined that no associated client is connected with the gateway.

At step 408: The gateway detects whether a client(s) connected with it changes. If the detection result is "Yes", return to step 403 to repeat the above process of controlling the controllable device. Optionally, considering that the associated client of the controllable device changes at a low frequency, the gateway can also return to step 405 to repeat the above process. If the detection result is "No", the gateway will perform detection of the connected client again after a period of time.

Alternatively or additionally, the gateway can repeat the above process at certain time intervals.

Although in the above example implementation, the reference device is explained by taking the example of the gateway, it could be understood that the method according to an embodiment of this disclosure is also applicable for other reference devices.

Because a gateway has a limited coverage area, the connection between a client and the gateway can indicate the position of the client relative to the gateway in many cases. For example, in a home LAN, when a client is connected with a gateway of the home LAN, it may be inferred that the client has been within the coverage area of the home LAN, i.e., in the vicinity of the gateway.

Figure 5:
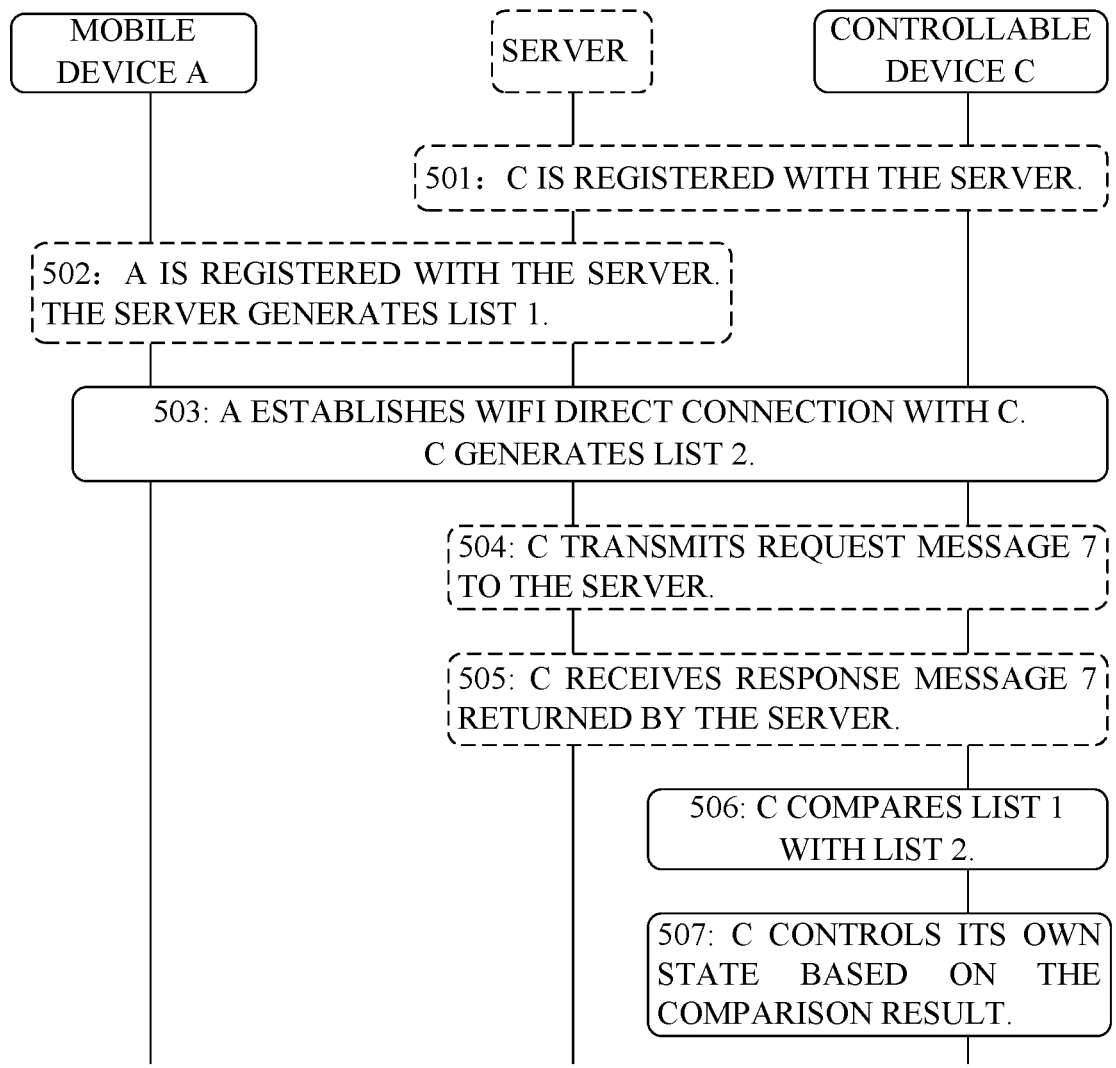
FIG. 5 is yet another example implementation of a method according to an exemplary embodiment.

However, such a determination of the position of the client can also be realized in other ways. FIG. 5 shows yet another example implementation of a method according to an embodiment of this disclosure, in which controllable device C is equipped with a short distance peer-to-peer connection functionality, e.g., WIFI Direct connection functionality. It could be understood that when the client is also equipped with the WIFI Direct connection functionality and is connected with the controllable device through WIFI Direct, it can also indicate that the client is in an area relatively close to the controllable device. Different from the solutions in FIG. 3 and FIG. 4, FIG. 5 shows that controllable device C is a reference device.

In this example implementation, the method for controlling the state of the controllable device is carried out by controllable device C.

Referring to FIG. 5, the method for controlling the state of the controllable device can comprise the following steps.

Step 501: Controllable device C is registered with a server. The server can store the identification information of controllable device C. The identification information of controllable device C can include the device name, the MAC address etc.

Step 502: Client list 1 of clients associated with controllable device C is generated in the server. In this example, mobile device A is registered with the server as an associated client of controllable device C. Client list 1 contains the identification information of mobile device A.

Alternatively, when client list 1 of clients associated with controllable device C is generated and maintained in the controllable device, steps 501 and 502 may be omitted.

Step 503: When mobile device A reaches the vicinity of controllable device C, mobile device A establishes WIFI Direct connection with controllable device C. Controllable device C stores the identification information of mobile device A and accordingly generates client list 2. Client list 2 contains the identification information of mobile device A. In some embodiments, controllable device C forms client list 2 based on the client that currently establishes WIFI Direct connection with it.

Step 504: Controllable device C transmits request message 7 to the server to request the server to provide the list 1 of the associated clients of controllable device C.

Step 505: Controllable device C receives response message 7 returned by the server. The response message 7 may carry the list 1.

In some exemplary embodiments, client list 1 may be generated after the server receives the request message, and client list 2 may be generated at the same time or after the request message is transmitted.

In some exemplary embodiments, when client list 1 is generated and maintained by controllable device C, the steps 504 and 505 may be omitted.

Step 506: Controllable device C compares the list 1 with the list 2 so as to determine whether the associated client is connected with the reference device.

Step 507: Controllable device C controls its own state based on the comparison result. For example, when the comparison result indicates that an associated client of controllable device C is connected with controllable device C, controllable device C can control its state accordingly, e.g., changing its own working mode.

With the method for controlling the state of the controllable device according to an exemplary embodiment, automatic control of the controllable device can be achieved by controlling the state of the controllable device based on the state of the connection between an associated client of the controllable device and the reference device, which avoids manual control and improves user experience.

Figure 6:
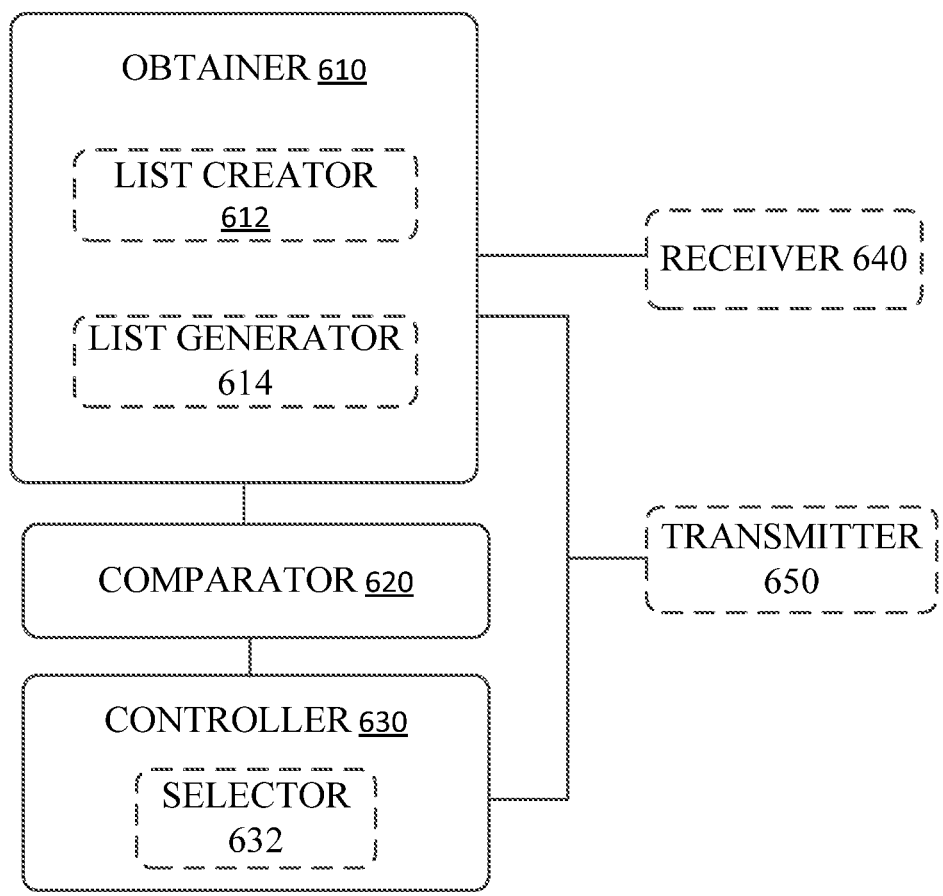
FIG. 6 shows a structural schematic view of an apparatus for controlling a state of a controllable device according to an exemplary embodiment.

FIG. 6 shows an apparatus 600 for controlling a state of a controllable device according to an exemplary embodiment. The controllable device associates with at least one associated client and a reference device. The apparatus 600 comprises: an obtainer 610, a comparator 620, and a controller 630.

The obtainer 610 is used for obtaining a first client list of the at least one associated client(s) and a second client list of a client or clients connected with the reference device.

The comparator 620 is used for comparing the first client list with the second client list so as to determine whether any of the at least one associated client is connected with the reference device.

The controller 630 is used for controlling the state of the controllable device based on the comparison result.

In an exemplary embodiment, the controller 630 can control the state of a controllable component of the controllable device, for example the state of a mechanical structure and/or the working mode of an electronic component, based on the comparison result.

According to an exemplary embodiment, the apparatus 600 may further comprise: a transmitter 640 and a receiver 650.

In some exemplary embodiments, the first client list is maintained by the server. The obtainer 610 is configured to instruct the transmitter 640 to transmit a first request message to the server to request the server to provide the first client list, and obtain the first client list from a first response message received by the receiver 650, which carries the first client list and is returned by the server.

In some exemplary embodiments, the second client list is maintained by the reference device. The obtainer 610 is configured to instruct the transmitter 640 to transmit a second request message to the reference device to request the reference device to provide the second client list, and obtain the second client list from a second response message received by the receiver 650, which carries the second client list and is returned by the reference device.

In some exemplary embodiments, the obtainer 610 can further comprise a list creator 612 and/or a list generator 614. The list creator 612 is configured to create the first client list based on a client registered with the server as being associated with the controllable device, and/or, create the first client list based on a user input and include the associated client of the controllable device therein. The list generator 614 is configured to generate the second client list based on a client currently connected to the reference device.

In some exemplary embodiments, the first client list and the second client list contain the identification information of the clients. The comparator 620 is configured to match the identification information of the clients in the first and second client lists and output corresponding connection information. For example, if there are one or more pairs of matched client identification information, the comparator 620 will determine that one or more associated clients of the controllable device have been connected to the reference device, and then output a corresponding indication indicative of being connected. However, if there is no any matching, the comparator 620 will determine that no associated client is connected with the reference device currently, and then output a corresponding indication indicative of being unconnected. Optionally, the connection information outputted by the comparator 620 can also contain indications of other clients connected with it, for instance, a piece of connection information being output may be: an associated client A and an unassociated client B are connected, etc.

In some exemplary embodiments, the controller 630 generates a corresponding control request message based on the comparison result, and instructs the transmitter 640 to transmit the control request message to the controllable device so as to control its state, optionally, a state of its controllable component.

In an example implementation, the controllable device accesses a communication network through a network access device and the network access device is the reference device. In one embodiment, the network access device may be a gateway, e.g., a gateway of a LAN.

According to an exemplary embodiment of this disclosure, a controllable device is further provided, comprising the apparatus for controlling the state of the controllable device as stated above.

Additionally or alternatively, in some exemplary embodiments, the first client list is created and maintained in the controllable device. Thus, the obtainer 610 of the controllable device comprises: a list creator 612 for creating the first client list by receiving a user input so as to obtain the list.

Additionally or alternatively, in some exemplary embodiments, the controllable device further comprises a short distance peer-to-peer connection (e.g., WIFI Direct, Bluetooth etc.) module, and is the reference device. At this point, the obtainer of the controllable device further comprises:

a list generator 614 being configured to generate the second client list based on the identification information of a client that establishes a short distance peer-to-peer connection with it currently so as to obtain the list.

According to an exemplary embodiment, a network access device is further provided, comprising the apparatus for controlling the state of the controllable device as stated above.

In some exemplary embodiments, the network access device is the reference device of the controllable device. In such embodiments, the obtainer of the network access device is configured to instruct the transmitter 640 to transmit a request message to the controllable device to request the controllable device to provide the first client list, and obtain the first client list from a third response message received from the receiver 650, which carries the first client list and is returned by the controllable device. The obtainer of the network access device can further comprise a list generator 614 being configured to generate the second client list based on the identification information of a client that establishes a short distance peer-to-peer connection with it currently.

Optionally, the first client list is obtained from the server after the controllable device receives the request message.

In some exemplary embodiments, the controller 630 of the network access device can comprise a selector 632 being configured to select a control instruction based on the comparison result. The controller is further configured to instruct the transmitter to transmit a control request message carrying the control instruction to the controllable device, so as to instruct the controllable device to execute the control instruction.

The first client list may be generated by the server and/or created by a user of the controllable device. The server can create the first client list based on one or more clients registered with it. Alternatively, or additionally, the user of the controllable device can create the first client list according to his/her own requirement and add therein one or more clients associated with the controllable device.

With the apparatus for controlling the state of the controllable device, the controllable device and the network access device in embodiments of this disclosure, automatic control of the controllable device can be achieved by controlling the state of the controllable device based on the state of the connection between the associated client of the controllable device and the reference device, which avoids manual control and improves user experience.

Figure 7:
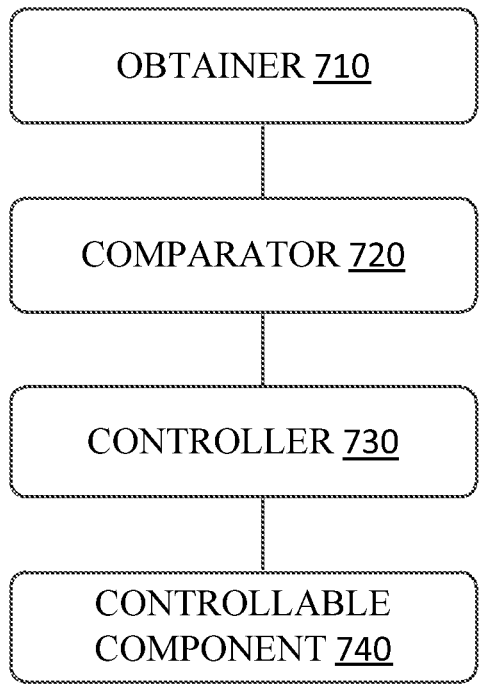
FIG. 7 shows a structural schematic view of a controllable device according to an exemplary embodiment.

FIG. 7 shows a structural schematic view of a controllable device 700 according to an embodiment of this disclosure. The controllable device 700 associates with at least one associated client and a reference device. The controllable device 700 can comprise an apparatus for controlling its state. As shown in FIG. 7, the controllable device 700 comprises: an obtainer 710, a comparator 720, a controller 730 and a controllable component 740.

The obtainer 710 is used for obtaining a first client list of the at least one associated client and a second client list of clients connected with the reference device. The comparator 720 is used for comparing the first client list with the second client list so as to determine whether any of the at least one associated clients is connected with the reference device. The controller 730 is used for controlling the state of the controllable component 740, and then controlling the state of the controllable device 700, based on the comparison result.

It could be recognized that the obtainer 710, the comparator 720, and the controller 730 can perform actions similar to the corresponding components as shown in FIG. 6.

It could be understood that although not shown in FIG. 7, the controllable device 700 can further comprise other various suitable components, including but not limited to the list creator for creating the first client list, the list generator for generating the second client list, the transmitter for transmitting the request message, the receiver for receiving the response message and the like as shown in FIG. 6.

Figure 8:
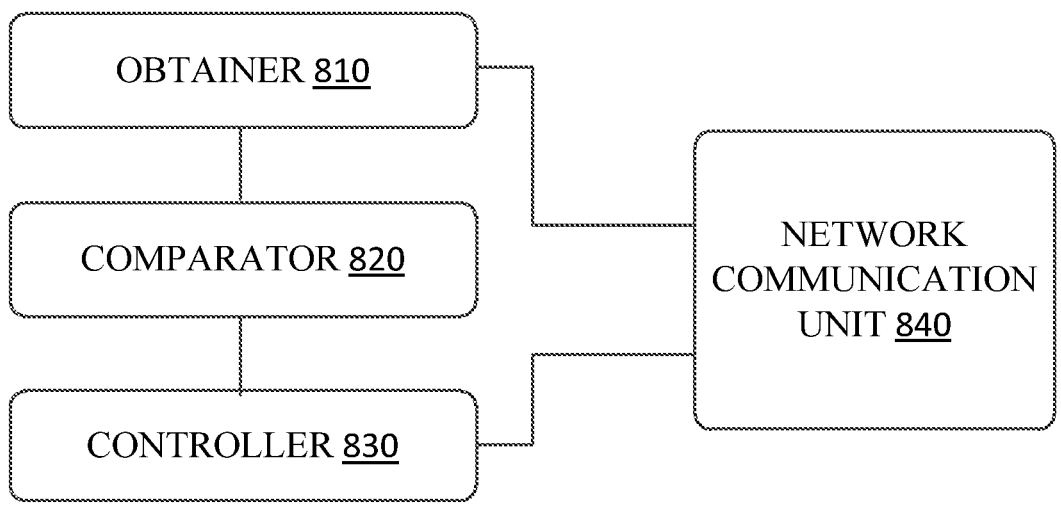
FIG. 8 shows a structural schematic view of a network access device according to an exemplary embodiment.

FIG. 8 shows a structural schematic view of a network access device 800 according to an embodiment of this disclosure. The network access device 800 can comprise the apparatus for controlling the state of the controllable device according to the present disclosure. As shown in FIG. 8, the network access device 800 comprises: an obtainer 810, a comparator 820, a controller 830 and a network communication unit 840.

The obtainer 810 is used for obtaining a first client list of associated clients of the controllable device and a second client list of clients connected with the network access device. The comparator 820 is used for comparing the first client list with the second client list so as to determine whether any of the associated clients is connected with the network access device. The controller 830 is used for controlling the state of the controllable device based on the comparison result.

Here, the obtainer 810 obtains the first client list via the network communication unit 840. The controller 830 controls the state of the controllable device by transmitting a control message to the controllable device via the network communication unit 840.

It could be recognized that the obtainer 810, the comparator 820 and the controller 830 can perform actions similar to the corresponding components as shown in FIG. 6.

It could be understood that although not shown in FIG. 8, the network access device 800 can further comprise other various suitable components, including but not limited to the list generator for generating the second client list, the transmitter for transmitting the request message, the receiver for receiving the response message and the like as shown in FIG. 6.

Figure 9:
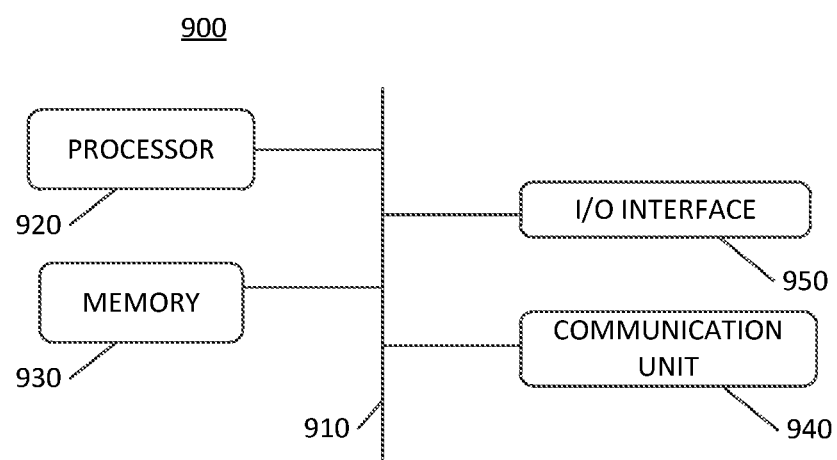
FIG. 9 shows a schematic view of an exemplary computing device adapted to implement an exemplary embodiment.

FIG. 9 shows an embodiment of an exemplary computing device 900 applicable for implementing various exemplary embodiments as stated above. The computing device 900 comprises various common computing units, such as one or more processors, coprocessors, memory units, chip sets, controllers, peripherals, interfaces, oscillators, timing devices, video cards, audio cards, voltage stabilizers and power management circuits etc.

The computing device 900 comprises a bus 910, a processor 920 and a memory 930.

In FIG. 9, the bus 910 provides an interface use for system components, including but not limited to, an interface from the memory 930 to the processor 920. The bus 910 may be any bus structure in several types of bus structures. The bus 910 can also interconnect various other circuits such as the peripherals, the voltage stabilizers and the power management circuits (not shown) together.

The processor 920 is used for executing tasks such as data processing, input/output processing and/or other functions. The processor 920 may be any of the various processors that may be available in the market. Optionally, the processor 920 may be CPU, ASIC, FPGA or CPLD etc.

The memory 930 provides volatile and/or nonvolatile storage of data, data structures, computer executable instructions and the like. The memory 930 can include a nonvolatile and/or volatile memory.

The computing device 900 further comprises a communication unit 940 being configured to perform wired and/or wireless communication with other devices under the control of the processor 920.

The communication unit 940 may include a transmitter, a receiver, a transceiver, a radio device, a network interface, a baseband processor, an antenna etc. The communication unit 940 may be a single integrated unit, and can also be a plurality of discrete units. In an example, the communication unit 940 is configured to receive external data from other devices in a wireless communication manner, and transmit the data processed by the processor 920 to the other devices.

Optionally, depending on the property of the computing system, the computing device 900 can also provide an input/output interface 950, e.g., a keypad, a display, a loudspeaker, a microphone, an operating lever.

According to an exemplary embodiment, the computing device 900 may be configured to store in the memory 930 a computer program that can be run on the processor 920, wherein the processor 920 when executing the program implements the steps of the method for controlling the controllable device according to an exemplary embodiment.

According to an exemplary embodiment, the computing device 900 may be configured to implement the apparatus for controlling the state of the controllable device, the controllable device and the network access device according to embodiments of this disclosure.

An exemplary embodiment can further comprise articles of manufacture. The articles of manufacture can include a storage medium for storing logic. The examples of the storage medium can include one or more types of computer readable storage media that can store electronic data, including volatile memory or nonvolatile memory, removable or unremovable memory etc. The examples of the logic can include various software units, such as a software component, a program, an application, a computer program, an application program, a system program, a machine program, an operating system software, a middleware, a firmware, a software module, a routine, a subprogram, a function, a method, a process, a software interface, an application program interface (API), an instruction set, a computing code, or any combination thereof. In one embodiment, for example, the articles of manufacture can store computer executable program instructions, when they are executed by the computer, the computer is enabled to execute the method and/or the operation according to the embodiments described.

It should be noted that unless otherwise specified, "first", "second" and/or the like are not intended to imply a temporal aspect, a space aspect, an ordering, etc. Rather, such terms are only used as identifiers, names, etc. for features, elements, items, etc. For example, a first object and a second object generally correspond to object A and object B, or two different or two identical objects, or the same object.

In addition, as used herein, the word "or" is intended to refer to inclusive "or" rather than exclusive "or". In addition, unless otherwise specified or it is clear from the context that it refers to the singular form, "a" and "an" as used in the present application are generally interpreted as "one or more". Furthermore, at least one of A and B and/or similar expressions generally mean A or B or both A and B. In addition, to the extent that "includes", "having", "has", "with", and/or variants thereof are used in either the detailed description or the claims, such terms are intended to be inclusive in a manner similar to the term "comprising".

Various aspects of this disclosure may be used solely, in combination or in various arrangements not discussed specifically in the embodiments described above; therefore, its application is not limited to the details and arrangements of the components expounded in the above description or shown in the figures. For example, some aspects described in one embodiment may be combined with some aspects described in other embodiments in any way.

What are stated above are exemplary embodiments. It should be pointed out that the ordinary skilled person in the art, on the premise of not departing from the principle of this disclosure, can also make some improvements and modifications. These improvements and modifications should also be regarded as the protection scopes of this disclosure.

The invention claimed is:

1. A method for controlling a state of a controllable device, the controllable device associating with at least one associated client and a reference device, the reference device being a gateway of a local area network to which the controllable device is connected, the method comprises:
    obtaining a first client list of the at least one associated client and a second client list of clients that are currently connected to the same local area network as the controllable device by connecting with the reference device;
    comparing the first client list with the second client list so as to determine whether one or more of the at least one associated client are connected to the same local area network as the controllable device vial the reference device; and
    controlling the state of the controllable device so that the controllable device is in a first state when one or more of the at least one associated client are connected to the same local area network as the controllable device via the reference device and is in a second state that is different from the first state when no associated client is connected to the same local area network as the controllable device vial the reference device.

2. The method for controlling a state of a controllable device according to claim 1, wherein the first client list is maintained by a server and the second client list is maintained by the reference device, and the obtaining comprises steps performed by the controllable device:
    transmitting a first request message to the server to request the server to provide the first client list;
    receiving a first response message returned by the server, which first response message carries the first client list;
    transmitting a second request message to the reference device to request the reference device to provide the second client list; and
    receiving a second response message returned by the reference device, which second response message carries the second client list.

3. The method for controlling a state of a controllable device according to claim 2, wherein the controllable device accesses the server through a network access device.

4. The method for controlling a state of a controllable device according to claim 3, wherein the network access device is the gateway.

5. The method for controlling a state of a controllable device according to claim 1, wherein the first client list is maintained by a server, and the obtaining comprises steps performed by the reference device:
    generating the second client list based on the clients currently connected to the reference device;
    transmitting a third request message to the controllable device to request the controllable device to provide the first client list; and
    receiving a third response message returned by the controllable device, the third response message carrying the first client list obtained by the controllable device from the server.

6. The method for controlling a state of a controllable device according to claim 5, wherein the controlling comprises steps performed by the reference device:
    determining a control instruction based on the result of the comparing; and
    transmitting a control request message carrying the control instruction to the controllable device to instruct the controllable device to execute the control instruction.

7. The method for controlling a state of a controllable device according to claim 1, wherein the reference device is equipped with a short distance peer-to-peer connection functionality, and the obtaining further comprises: generating the second client list based on a client that currently establishes a short distance peer-to-peer connection with the reference device.

8. The method for controlling a state of a controllable device according to claim 1, wherein the obtaining further comprises:
    creating the first client list based on a client registered with the server as being associated with the controllable device, or
    creating the first client list based on a user input.

9. A computing device for controlling a state of a controllable device, comprising a memory, a processor and a computer program stored on the memory and run on the processor, wherein the processor, when executes the program, implements the steps of the method according to claim 1.

10. The method for controlling a state of a controllable device according to claim 1, wherein the state of the controllable device comprises at least one selected from a group consisting of a state of mechanical structure of the controllable device and a state of working mode of the controllable device.

11. The method for controlling a state of a controllable device according to claim 1, wherein the state of the controllable device is a controllable state other than a networking state of the controllable device.

12. A non-transitory computer readable storage medium, on which a computer instruction is stored, wherein the instruction, when executed by the processor, performs the steps of the method according to claim 1.

13. An apparatus for controlling a state of a controllable device, the controllable device having at least one associated client and a reference device associated with it, the reference device being a gateway of a local area network to which the controllable device is connected, the apparatus comprises:
   an obtainer being configured to obtain a first client list of the at least one associated client and a second client list of clients that are currently connected to the same local area network as the controllable device by connecting with the reference device;
   a comparator being configured to compare the first client list with the second client list so as to determine whether any of the at least one associated client is connected to the same local area network as the controllable device via the reference device; and
   a controller being configured to control the state of the controllable device so that the controllable device is in a first state when one or more of the at least one associated client are connected to the same local area network as the controllable device via the reference device and is in a second state that is different from the first state when no associated client is connected to the same local area network as the controllable device via the reference device.

14. The apparatus for controlling a state of a controllable device according to claim 13, wherein the first client list is maintained by a server and the second client list is maintained by the reference device, and the apparatus further comprises: a transmitter and a receiver, and
   the obtainer is configured to instruct the transmitter to transmit a first request message to the server to request the server to provide the first client list, and transmit a second request message to the reference device to request the reference device to provide the second client list; and the obtainer is further configured to obtain the first client list from a first response message received by the receiver and obtain the second client list from a second response message received by the receiver, the first response message being returned by the server and the second response message being returned by the reference device.

15. The apparatus for controlling a state of a controllable device according to claim 13, wherein the reference device is equipped with a short distance peer-to-peer connection functionality, and the obtainer comprises: a list generator being configured to generate the second client list based on a client that currently establishes a short distance peer-to-peer connection with the reference device.

16. The apparatus for controlling a state of a controllable device according to claim 13, wherein the obtainer comprises: a list generator being configured to generate the second client list based on a client currently connected to the reference device;
   the apparatus further comprises: a transmitter and a receiver, and the obtainer is configured to: instruct the transmitter to transmit a third request message to the controllable device to request the controllable device to provide the first client list; and obtain the first client list from the third response message received by the receiver.

17. The apparatus for controlling a state of a controllable device according to claim 16, wherein the controller comprises a selector being configured to select a control instruction based on a result of comparison from the comparator, and
   the controller is configured to instruct the transmitter to transmit a control request message carrying the control instruction to the controllable device to instruct the controllable device to execute the control instruction.

18. The apparatus for controlling a state of a controllable device according to claim 13, wherein the apparatus further comprises: a list creator being configured to create the first client list based on a client registered with the server as being associated with the controllable device, or creating the first client list based on a user input.

19. A controllable device, comprising:
   the apparatus for controlling a state of a controllable device according to claim 13, and
   a controllable component;
   wherein the controller is configured to control state of the controllable component based on the result of comparison from the comparator.

20. A network access device, comprising:
   the apparatus for controlling a state of a controllable device according to claim 9, and
   a network communication unit;
   wherein the network access device acts as the reference device and the obtainer is configured to obtain the first client list via the network communication unit, and the controller is configured to transmit a control request message to the controllable device via the network communication unit.

* * * * *

UNITED STATES PATENT AND TRADEMARK OFFICE
CERTIFICATE OF CORRECTION

PATENT NO. : 11,258,636 B2
APPLICATION NO. : 16/479233
DATED : February 22, 2022
INVENTOR(S) : Junjie Zhao It is certified that error appears in the above-identified patent and that said Letters Patent is hereby corrected as shown below:

In the Claims

Claim 20, Column 22, Line 48, should read as follows:
--device according to claim 13, and--

Signed and Sealed this
Eighteenth Day of July, 2023

Katherine Kelly Vidal
*Director of the United States Patent and Trademark Office*